US011287246B2

(12) United States Patent
Boulanger et al.

(10) Patent No.: US 11,287,246 B2
(45) Date of Patent: Mar. 29, 2022

(54) METHOD AND DEVICE FOR INSPECTING A SURFACE OF AN OBJECT COMPRISING NONSIMILAR MATERIALS (71) Applicants: UNITY SEMICONDUCTOR, Montbonnot-Saint-Martin (FR); COMMISSARIAT A L'ENERGIE ATOMIQUE ET AUX ENERGIES ALTERNATIVES, Paris (FR)

(72) Inventors: Jean-François Boulanger, Saint-Ismier (FR); Stéphane Godny, Corenc (FR)

(73) Assignees: UNITY SEMICONDUCTOR, Montbonnot-saint-Martin (FR); COMMISSARIAT A L'ENERGIE ATOMIQUE ET AUX ALTERNATIVES, Paris (FR)

( * ) Notice: Subject to any disclaimer, the term of this patent is extended or adjusted under 35 U.S.C. 154(b) by 0 days.

(21) Appl. No.: 16/967,649

(22) PCT Filed: Jan. 25, 2019

(86) PCT No.: PCT/EP2019/051894
§ 371 (c)(1),
(2) Date: Aug. 5, 2020

(87) PCT Pub. No.: WO2019/149638
PCT Pub. Date: Aug. 8, 2019

(65) Prior Publication Data
US 2021/0239462 A1    Aug. 5, 2021

(30) Foreign Application Priority Data
Feb. 5, 2018   (FR) ...................................... 1850936

(51) Int. Cl.
G01B 11/14    (2006.01)
G01B 11/24    (2006.01)
(Continued)

(52) U.S. Cl.
CPC .......... G01B 11/2441 (2013.01); G01B 11/06 (2013.01); G01N 21/9501 (2013.01)

(58) Field of Classification Search
CPC .................................................. G01B 11/2441
(Continued)

(56) References Cited

U.S. PATENT DOCUMENTS 6,181,474 B1 *   1/2001   Ouderkirk .......... G02B 21/0052
                                                      250/252.1
6,215,555 B1     4/2001   Chivers
(Continued)

FOREIGN PATENT DOCUMENTS

WO    2004015367 A1    2/2004

OTHER PUBLICATIONS

French Search Report from French Patent Application No. 1850936, dated Sep. 3, 2018.
(Continued)

Primary Examiner — Dominic J Bologna
Assistant Examiner — Omar H Nixon
(74) Attorney, Agent, or Firm — Greer, Burns & Crain, Ltd (57) ABSTRACT A method and related device for measuring the profile of a surface of an object to be measured having zones made from at least two different materials, the object to be measured forming part of a plurality of substantially identical objects, the plurality of objects also including at least one reference object having at least one reference surface, the method including the following steps: determining a correction function, from a first profile signal of a first reference surface and a second profile signal from a second reference surface, the second reference surface being metallized; acquiring a profile signal from the surface of the object to be measured; and applying the correction function to the profile signal
(Continued)

from the surface of the object to be measured to obtain a corrected profile signal; the profile signals being obtained from interferometric measurements.

16 Claims, 7 Drawing Sheets

(51) Int. Cl.
  *G01B 11/06* (2006.01)
  *G01N 21/95* (2006.01)
(58) Field of Classification Search
  USPC ........................................................ 356/511
  See application file for complete search history.

(56) References Cited

U.S. PATENT DOCUMENTS

| | | | |
|---|---|---|---|
| 7,136,168 B2 | 11/2006 | Dulman | |
| 8,213,021 B2 * | 7/2012 | Chen | ................. G01B 9/02083 356/511 |
| 2002/0151140 A1 * | 10/2002 | Nakasugi | ............... B82Y 10/00 438/275 |
| 2004/0263840 A1 | 12/2004 | Segall et al. | |
| 2007/0091318 A1 * | 4/2007 | Freishlad | ........... G01B 9/02084 356/511 |
| 2009/0021723 A1 * | 1/2009 | De Lega | ............... G01B 9/0209 356/73 |
| 2010/0265517 A1 * | 10/2010 | You | .................... G01B 9/02028 356/511 |
| 2012/0229621 A1 | 9/2012 | Turner et al. | |
| 2012/0314206 A1 * | 12/2012 | Spizig | ................. G02B 21/006 356/72 |
| 2013/0304399 A1 * | 11/2013 | Chen | ........................ G06T 7/12 702/40 |
| 2017/0105618 A1 | 4/2017 | Schmoll et al. | |

OTHER PUBLICATIONS

International Search Report and Written Opinion for International Patent Application No. PCT/EP2019/051894, dated Mar. 28, 2019.

* cited by examiner

METHOD AND DEVICE FOR INSPECTING A SURFACE OF AN OBJECT COMPRISING NONSIMILAR MATERIALS

BACKGROUND

The present invention relates to a method for measuring the profile or the form of a surface of an object that can comprise structures or patterns made from at least two different materials. It also relates to a device for measuring a surface of an object implementing such a method.

The field of the invention is more particularly, but non-limitatively, that of optical profilometry.

State of the Art

Optical profilometry makes it possible to determine the profile or the topography of a face or a surface of an object, with a view to determining a surface form, or imaging patterns, roughness, etc. present on the face and to obtain their height.

It is based on measuring, then studying, an interferometric signal obtained between a reference optical radiation and an inspection optical radiation originating from one and the same source, sent respectively to a reference surface and to the inspected surface, and reflected by said surfaces. By varying the optical path of the reference or inspection radiations with respect to one another, it is possible to determine from analysis of interference fringes the difference in length of the optical path travelled by the reflected inspection optical radiation with respect to that of the optical path of the reference radiation, and to deduce therefrom the depth or the height of the inspected surface at each measurement point, and thus to detect the relative height of the different patterns or structures present on said surface, such as steps or trenches.

However, the wave reflected on the surface of the object undergoes phase shifting that depends on the physical characteristics of the materials, such as their complex refractive indices and the thicknesses for the wafer layer stacks (for transparent materials). This phase shifting on reflection is added to the phase shifting due to the topography described above. When the patterns or structures present on the surface of the objects are produced from different materials, the phase shifting on reflection is then different for each of the materials. Thus, the relative height obtained between patterns made from different materials is inaccurate. For example, a step constituted by a certain material deposited on a substrate of another material may appear higher than it is in reality, or conversely, a step may appear lower or even like a trench. Similarly, two coplanar surfaces may appear to be different in height. Such profilometry measurements cannot be conveniently exploited.

In order to overcome this drawback, it is known to calculate theoretical reflection phases by exploiting the items of information that are available a priori on the materials or the stacks of layers of materials present. In this way theoretical reflectivity models are constructed that are used for correcting the measurements. This approach is however very cumbersome and of limited use in particular as a result of the uncertainties about the a priori items of information that are available. Moreover, in order to correct a topographical measurement in this way, it is also necessary to identify the different materials present in the microscopic field, which may present difficulties on multiple or subresolved structures.

SUMMARY

A purpose of the present invention is to propose a method and a system for measuring the profile of a surface of an object that allow these drawbacks to be overcome.

Another purpose of the present invention is to propose a method and a system for measuring the profile of a surface of an object without using a priori knowledge on the nature of the materials and the geometry of the patterns.

Another purpose of the present invention is to propose a method and a system for measuring the profile of a surface of an object making it possible to measure with accuracy the relative height of the patterns or structures present on the surface without complex or expensive modification of the existing measuring means.

These objectives are achieved at least partially with a method for measuring the profile of a surface of an object to be measured, in particular comprising zones or structures made from at least two different materials, the object forming part of a plurality of substantially identical objects, the plurality of objects also comprising at least one reference object having at least one reference surface, the method comprising the following steps:

determining a correction function, from a first profile signal from a first reference surface and a second profile signal from a second reference surface, the second reference surface being metallized;

acquiring a profile signal from the surface of the object to be measured; and applying the correction function to the profile signal from the surface of the object to be measured, in order to obtain a corrected profile signal;

in which the profile signals are obtained from interferometric measurements.

The method according to the invention can advantageously be implemented in order to measure the profile of a surface of an object to be measured, said surface comprising zones or structures made from at least two different materials. Of course, it can also be implemented in order to measure the profile of a surface of an object to be measured that is homogenous, or comprising only one material.

Within the framework of the invention, a profile of a surface corresponds to the relative height, or to the height with respect to a reference, of a set of points of the surface distributed along one or two axes (X, Y) of a reference system. The surface profile is thus representative of the form of this surface and is intended to determine in particular relative heights of structures present and/or surface conditions such as measurements of roughness.

A profile signal can be or correspond to a profile, or to a variable representative of a profile.

The correction function is a function which, applied to a profile signal, sends a corrected profile signal. It can comprise for example a combination with a correction profile signal, or with a variable representative of a correction profile.

Within the framework of the invention, objects called "substantially identical" are objects that are assumed to be identical, or identical in theory, or by design, but which may present variations or differences originating, for example, from a variability or uncertainties in their manufacturing process. These "substantially identical" objects can in particular comprise a surface with zones having the same location and the same materials, but the profiles of which have differences, at least in certain places. Thus, the plurality of objects can originate in particular from a manufacturing series or batch, or from one and the same manufacturing process. It can be, for example, from a production series or batch of substrates (wafers, etc.) comprising optical or electronic components.

The interferometric measurements are carried out by using optical interferometric or interferometry techniques functioning in the terahertz frequency band, known to a person skilled in the art. These interferometric measurements exploit the interferences between a reference beam or radiation and an inspection beam or radiation reflected by the surface to be inspected. These interferometric measurements make it possible to determine an altitude or a height at different points of this surface. These combined altitudes produce profile signals representative of a form or a(n) (altitude) profile of this surface.

The second reference surface is metallized, i.e. it comprises a layer of metal deposited prior to the interferometric measurements. The layer of metal is homogenous over the entire surface and its thickness is such that an incident measuring wave coming from a measuring system is completely reflected by the metallized surface and does not penetrate into the metallic layer. Furthermore, this layer of metal is sufficiently fine to conform to, i.e. to faithfully reproduce on its surface, the profile or the form of the surface that it covers.

Preferably, the first reference surface is not metallized, or at least it is not modified, in the sense that it has not undergone deposition of a layer of metal prior to the interferometric measurements. However, of course, the first surface can comprise metallized zones if they form part of the object to be measured.

The method according to the invention thus proposes to choose, from a plurality of objects forming for example part of one and the same production series of said objects, at least one reference object that is used for determining a correction function or profile, in particular at each location of interest. This correction function or profile is then applied to all the profilometric measurements taken on the other objects to be measured, for example from this production series.

Thus, assuming that the objects are sufficiently identical to each other and to the reference object, at least with respect to the complex reflectivity of the zones or the structures present, the method according to the invention allows the profilometric measurements to be corrected in order to obtain the corrected profiles of all the objects. The corrected profile represents the correct relative height of the different zones or structures on the surface of the objects.

The influence of the phase shifting on reflection on the surface, depending on the physical characteristics of the different types of materials present on the surface of the objects, on the measured height of the zones or patterns can then be eliminated, by using the reference measurements. Only the reference object then remains unusable due to the metallization of its surface.

It should be noted that the "loss" of the metallized reference object is not very inconvenient as it is common during the production of substrates (wafers, etc.) comprising optical or electronic components to metallize some of them in order to carry out measurements intended for quality control by sampling. From this point of view, the invention makes it possible to minimize the number of objects metallized and thus destroyed by making it possible to carry out non-destructive testing on all or part of the objects produced. Moreover, the invention makes it possible to test objects actually produced and usable and therefore not destroyed, by contrast with destructive testing methods by sampling.

Thus, the method according to the invention can advantageously be used for testing the production process of the objects. The quality of the process can thus be monitored, and process parameters can be adjusted in the event of deviation from the desired profile. As previously explained, only a small quantity of objects (for example one per manufacturing batch or per series) is scrapped in order to constitute the reference objects.

Thus, for the determination step, no a priori knowledge on the nature or the thickness of the materials of the surfaces or on the geometry of the layers or patterns is necessary. As a result, the method according to the invention can be implemented by the current measurement devices, in combination with a device for deposition of a layer of metal, which is known to a person skilled in the art. No addition of specific equipment is necessary.

Advantageously, the steps of acquiring a profile signal and applying the correction function can be carried out for a plurality of objects to be measured originating from one and the same production series.

Similarly, the step of determining a correction function can be carried out with at least one reference object originating from one and the same production series as the objects to be measured.

Thus the correction function can be applied to each of the profile measurements of all the objects to be measured from the plurality of objects, originating for example from one and the same production series. It is therefore possible to know the variability of the manufacturing method from one object to another, or over time. In addition, only one object or sample from the inspected series becomes unusable following metallization of its surface.

Advantageously, the second reference surface can correspond to the first reference surface, metallized (or after having been metallized), of one and the same reference object.

In this case, a single reference object can be chosen, and the reference profile signals are acquired before and after metallization of the reference surface.

Alternatively, the first reference surface and the second reference surface can be corresponding surfaces of two different reference objects.

In this embodiment, the correction function is determined from two reference objects, only one of which has a metallized surface.

The correction function can also be generated from a plurality of measurements on, respectively, a plurality of first reference surfaces and a plurality of second reference surfaces, belonging to a plurality of reference objects, identical or different. It is thus possible to obtain a correction function corresponding to an average of the corrections determined over the plurality of reference objects.

The method according to the invention can comprise a metallization step, comprising deposition of a conforming layer of metal on a reference surface of a reference object.

This layer of metal must be sufficiently thick so that it is not transparent to light, but sufficiently thin so as not to change the form of the surface, and therefore to conform closely. In practice, it can be constituted by a layer of the order of several tens of nanometres of metal (for example 40 nm of tantalum).

This metallization step can be carried out by implementing techniques known to a person skilled in the art, such as for example techniques of the CVD (chemical vapour deposition) type or PVD (physical vapour deposition) type. Among the PVD type techniques, there may be mentioned in particular vacuum deposition and cathodic spraying (sputtering).

Advantageously, the step of determining the correction function can be carried out at several positions, called positions of interest, of the first and second reference surface, located identically on the first reference surface and the second reference surface respectively. In particular, the positions of interest can be chosen such that each position of interest of the first reference surface corresponds to one and the same position of interest of the second reference surface.

The positions of interest correspond to points of interest in the profile signals (or the profiles) of the first and second reference surface. The correction function can thus be determined from the values of the profile signals from the first and second reference surface at these points of interest. It thus constitutes a correction profile that makes it possible to correct systematic errors in the profile signals.

The step of acquiring a profile signal can be carried out at several positions, called measurement positions, of the surface of the object to be measured, located identically to the positions of interest of the reference surfaces, or located in zones having the same characteristics (i.e. made from the same materials, and preferably, the same geometrical configuration of structures) as the positions of interest. The step of applying the correction function can be carried out for said measurement positions of the surface of the object, by taking account of the corresponding positions of interest.

As previously, the measurement positions correspond to measurement points in the profile signal from the surface of the object to be measured. The correction function (or the correction profile) can thus be applied to the profile signal from the surface of the object to be measured, at the measurement points corresponding to the measurement positions.

According to embodiments, the step of determining a correction function can comprise a difference (or a subtraction) between the second profile signal and the first profile signal, the two profile signals originating from the reference measurements on the reference surfaces. This step can produce a correction profile signal.

Such a step of difference or subtraction is not very complex to implement, needs few resources and a very short processing time.

According to embodiments, the step of applying the correction function can comprise a summation, optionally algebraic, of a correction profile signal and the profile signal.

Such a step of summation is not very complex to implement, needs few resources and a very short processing time.

According to embodiments, the method according to the invention can comprise a step of geometrical alignment of the second profile signal from the second reference surface with respect to the first profile signal from the first reference surface. This step can be carried out during the determination of a correction function.

According to embodiments, the method according to the invention can comprise a step of geometrical alignment of the profile signal from the surface of the object to be measured with respect to the first or second profile signal from a reference surface. This step can be carried out during the application of the correction function, in order to ensure that the correction function is correctly "positioned" spatially with respect to the surface of the object to be measured.

These alignment steps can comprise applying spatial transformation functions such as for example translations, rotations and/or magnification to at least one of the profile signals, so that the profile signals are best spatially superimposed. It thus makes it possible to correct errors of the acquisition device, such as any positioning errors of the object.

According to embodiments, the method according to the invention can be implemented in order to measure the profile of a surface of an object to be measured comprising a substrate, or an element produced on a substrate.

The substrate can be a substrate for producing integrated optical components, for example of the glass type. This can also be a semiconductor substrate, for example made from silicon. It can be, or comprise, non-limitatively, and in the terms commonly used, a wafer, a panel, a wafer carrier, a rebuilt wafer, a wafer-on-frame, etc.

The element produced on the substrate can comprise, for example, a chip or an electronic or optical circuit, and/or structures such as patterns, gratings, trenches, vias or connection elements.

According to embodiments, the method according to the invention can comprise steps of:
  determining a correction function from at least one reference substrate,
  acquiring a profile signal from another substrate to be measured.

According to another aspect of the same invention, a device is proposed for measuring the profile of a surface of an object, the surface comprising zones made from at least two different materials, the object forming part of a plurality of substantially identical objects originating from one and the same production series of said objects, the plurality of objects comprising at least one reference object having at least one reference surface, the device comprising:
  an interferometric measurement device arranged for acquiring, respectively, a first profile signal from a first reference surface, a second profile signal from a second, metallized reference surface, and a profile signal from the surface of the object to be measured;
  a processing module, configured for determining a correction function from the first profile signal and the second profile signal, and applying said correction function to the profile signal from the surface of the object to be measured in order to obtain a corrected profile signal.

The configuration of the processing module can be carried out electronically and/or computationally, in particular with instructions that can be executed by a processor or an electronic chip.

The processing module can be incorporated into the interferometric device, or be external to the measurement device and linked to said measurement device in a wired or wireless manner.

According to an advantageous embodiment, the interferometric measurement device can comprise a full-field interferometric sensor. According to non-limitative examples, the interferometric sensor can comprise a Phase-Shifting Interferometer (PSI) or a low-coherence Vertical Scan Interferometer (VSI).

According to embodiments, the device of the invention can also comprise a device for deposition of a layer of metal, in order to deposit a layer of metal on the second reference surface, prior to acquiring the interferometric signal from the second reference surface.

BRIEF DESCRIPTION OF THE DRAWINGS

Other advantages and characteristics of the invention will become apparent on reading the detailed description of implementations and embodiments which are in no way limitative, and from the attached figures, in which.

DETAILED DESCRIPTION

It is well understood that the embodiments that will be described hereinafter are in no way limitative. Variants of the invention can in particular be envisaged comprising only a selection of characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures keep the same reference.

Figure 1:
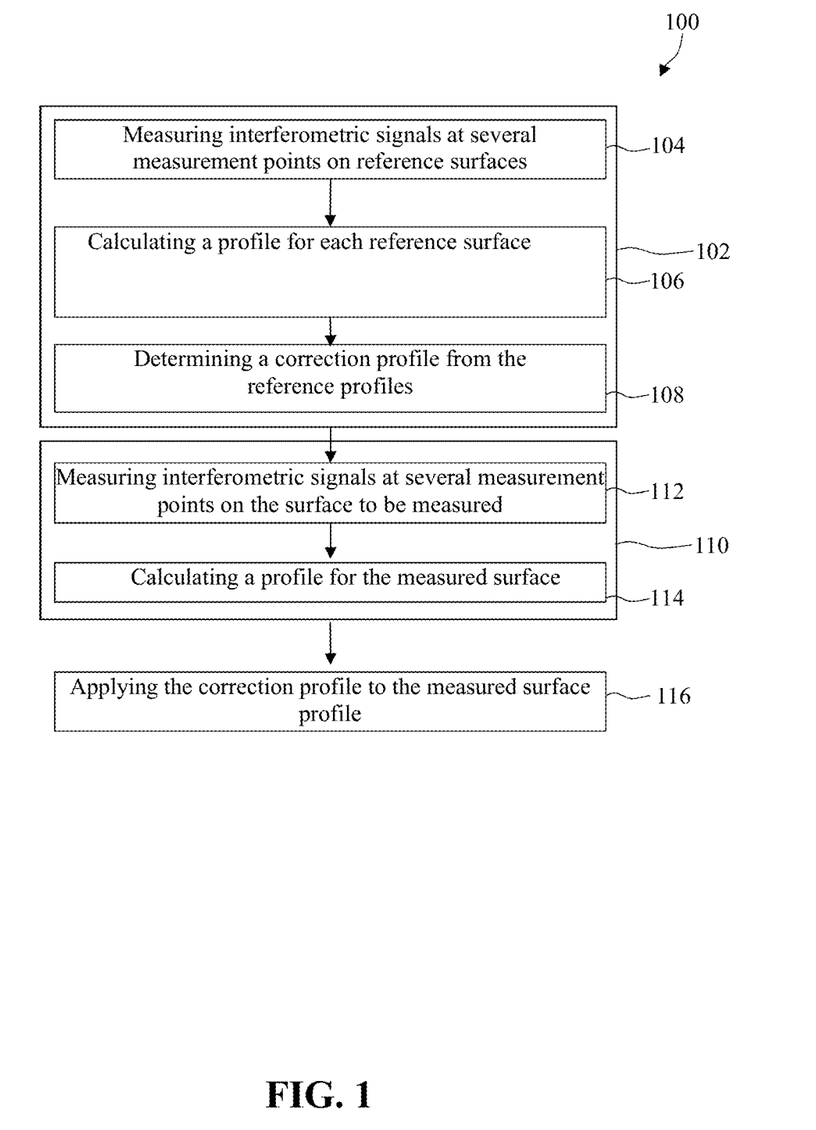
FIG. 1 is a diagrammatic representation of a non-limitative embodiment of a measurement method according to the invention.

FIG. 1 is a diagrammatic representation of a non-limitative embodiment of a method for the measurement of the profile of a surface of an object according to the invention.

The object one or more surfaces of which are to be inspected or measured for determining the profile thereof forms part of a plurality of substantially identical objects. In embodiments of the invention shown with respect to the figures, non-limitatively, the plurality of objects to be measured is constituted by a plurality of semiconductor substrates, for example in the form of wafers comprising electronic circuits, or chips, or other semiconductor components. These objects (or wafers) can for example form part of one and the same production series, and therefore assumed to be identical (or substantially identical), give or take manufacturing variations.

The plurality of objects also comprises at least one reference object having at least one reference surface. This or these reference object(s) can be for example one or more wafers originating from one and the same series as the objects to be measured, or originating from a reference series.

The method 100 comprises a calibration step 102, carried out using a first reference surface and a second reference surface.

The calibration phase 102 comprises a measurement step 104 of an interferometric signal at several measurement positions on the two reference surfaces. The reference surfaces are surfaces of the reference object(s).

Figure 6:
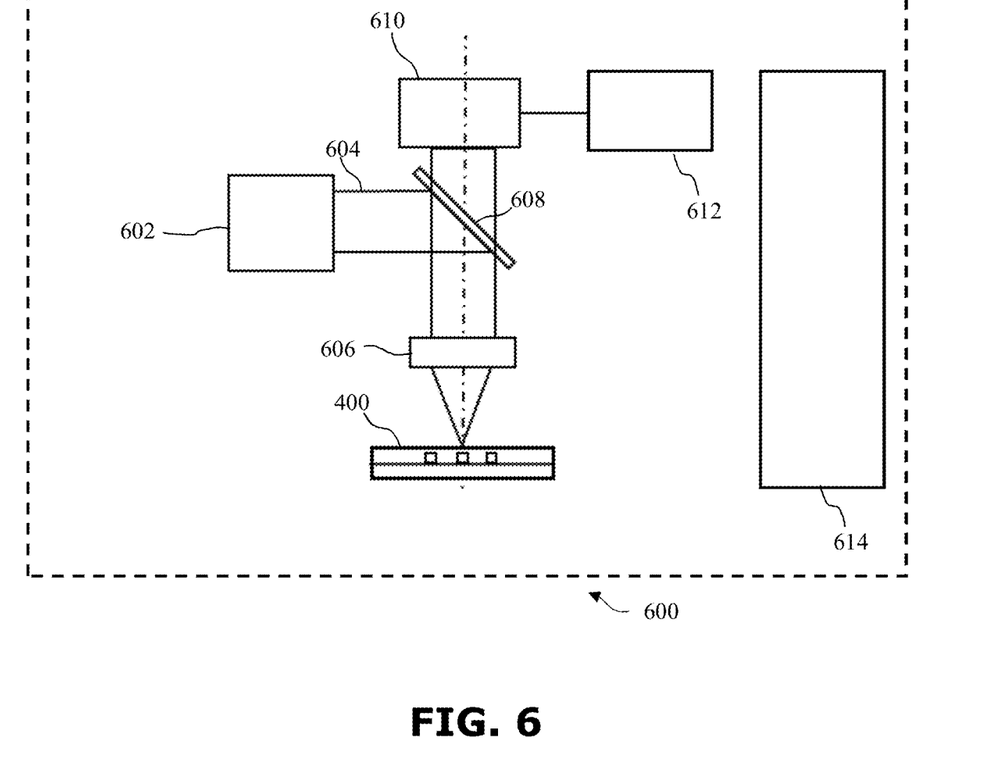
FIG. 6 is a diagrammatic representation of a non-limitative embodiment of a measurement system according to the invention.

The interferometric measurements are carried out by a measurement system comprising, for example, a full-field optical interferometric sensor such as shown in FIG. 6. This interferometric sensor comprises an imaging system that makes measurement positions on the surfaces correspond with the pixels of the field of view of the sensor, thus delivering an interferometric signal for each pixel of this sensor, or measurement point.

The second reference surface is metallized, i.e. it comprises a layer of metal deposited prior to the measurement step 102. The metallization of the surface consists in particular of a deposition of a homogenous conforming metallic layer over the entire surface. The thickness of the metallic layer must be adjusted such that an incident measurement wave coming from the measurement system is completely reflected by the metallized surface, without reaching the surface of the object and thus without being affected by the properties of the materials or the layers of materials of the object. Furthermore, the metallic layer must be sufficiently thin so as not to modify the relief or the profile of the surface of the object.

In practice, the metallic layer can be produced for example by a vacuum deposition technology, for example by physical vapour deposition (PVD). It can be constituted by a layer of the order of 40 nm of tantalum.

The method also comprises a step 106 of calculating a profile signal ĥ(x,y), hereinafter more simply called ĥ(x,y) profile, for each of the reference surfaces. These ĥ(x,y) profiles are obtained from interferometric signals measured at the measurement points (x,y) corresponding respectively to the measurement positions on the reference surfaces. To this end, the φ phase of each interferometric signal is obtained by using known phase extraction algorithms, for example PSI (phase-shifting interferometry) algorithms. This φ phase depends on the phase shift ψ on reflection of the measurement wave and a topographical contribution coming from the form of the measured surface. The φ phase is then used for determining the ĥ profile, which corresponds to the measured heights of the surface at the corresponding measurement positions:

$$\hat{h} = h + \psi \frac{\lambda}{4\pi},$$

where h is the set of real heights or altitudes of the surface and λ is the measurement wavelength. The phase-shifting value ψ depends on the material of the surface at the measurement position in question.

Hereinafter, the profile of the first reference surface will be called first $\hat{h}_1(x,y)$ profile and that of the second reference surface will be called second $\hat{h}_2(x,y)$ profile. The first and second profile correspond to reference acquisitions. The phase shifting on reflection on the second, metallized, reference surface is constant over the entire surface, $\psi_2(x,y) = \psi_2$, while the phase shift on reflection $\psi_1(x,y)$ on the first reference surface depends on the location on the surface corresponding to the measurement point (x,y) of the measured interferometric signal.

During a step 108, a correction function C(x,y), or C(x,y) correction profile, is determined from the first $\hat{h}_1(x,y)$ profile and the second $\hat{h}_2(x,y)$ profile for each measurement point (x,y), called point of interest in this case. In the embodiment implemented, the C(x,y) correction profile, also called correction map, is obtained by determining the difference between the first and the second profile at each point of interest (x,y):

$$C(x,y) = \hat{h}_2(x,y) - \hat{h}_1(x,y)$$

To this end, the step 108 of determining the correction function can also comprise, prior to the subtraction, a step of geometrical alignment for aligning the first and second profile with respect to one another, for example in translation, rotation and/or enlargement, such that the structures present on these two profiles are best superimposed in the plane (x,y).

The phase-shift terms on reflection are apparent from the preceding equation:

$$C(x, y) = h + \psi_2(x, y) \cdot \frac{\lambda}{4\pi} - h - \psi_1(x, y) \cdot \frac{\lambda}{4\pi}$$

and $$C(x, y) = (\psi_2 - \psi_1(x, y)) \cdot \frac{\lambda}{4\pi},$$

where $\psi_i(x,y)$ is the phase shift on reflection on each of the two reference surfaces.

The step 108 of determining the correction function $C(x,y)$ is carried out at several points of interest corresponding to several positions of interest of the first and second reference surface, each position of interest of the first reference surface corresponding to the same position of interest of the second reference surface.

The calibration phase 104 finishes in step 108.

The plurality of objects can comprise a single reference object, for example a wafer, having a reference surface that is measured before and after the metallization thereof in order to obtain the correction profile. In this case the second reference surface corresponds to the first reference surface after metallization.

Alternatively, the plurality of objects can comprise two distinct reference objects, each of which has a reference surface, the two reference surfaces being corresponding surfaces (i.e. the same surfaces) of the two reference objects, one of which being metallized and the other not. In this case, these can be two wafers originating from one and the same series, or two distinct objects on a reference wafer, the surface of which is partially metallized.

The method 100 according to the embodiment presented also comprises a step 110 of acquiring a profile of a surface of an object to be measured from the plurality of objects.

The step 110 of acquiring a profile comprises a step 112 of acquiring interferometric signals from the surface of the object to be measured, at several measurement positions. These measurement positions of the surface of the object must correspond substantially to the positions of interest of the reference surfaces for which the calibration step 102 was carried out, or, more generally, to a proximity to the positions of interest of the reference surfaces in which the correction profile $C(x,y)$ can be assumed to be known (for example because the materials present have similar characteristics).

In a step 114, a measured profile ii(x,y) is calculated from the interferometric signals. The calculation is preferably identical to that explained above for the reference measurements. A measured profile is thus obtained for the surface to be inspected.

The phase 110 of acquiring the profile to be measured finishes in step 114.

A step 116 of applying the correction function (or the correction profile) $C(x,y)$ to the measured profile $\hat{h}(x,y)$ is then carried out for all the measurement points or positions.

During this step 116, the correction profile is added to the measured profile, in order to obtain a profile signal, or corrected profile $\tilde{h}(x,y)$:

$$\tilde{h}(x,y) = \hat{h}(x,y) + C(x,y).$$

As it is assumed that the phase-shift effects on reflection are equivalent between the non-metallized reference surface and the surface to be measured, the latter expression can be re-expressed in the form:

$$\tilde{h}(x, y) = h(x, y) + \psi_1(x, y) \cdot \frac{\lambda}{4\pi} + (\psi_2 - \psi_1(x, y)) \cdot \frac{\lambda}{4\pi} = h(x, y) + \psi_2 \cdot \frac{\lambda}{4\pi}.$$

This corrected $\tilde{h}(x,y)$ profile represents the form of the measured surface in which the phase-shift contribution to the reflection $\psi_1(x,y)$ depending on the different materials on the measured surface has been eliminated. When the relative height is considered, i.e. the difference in height between the different measurement points or positions on the measured surface, it is noted that the relative corrected height $\Delta \tilde{h}$ does in fact correspond to the real physical relative height $\Delta h$:

$$\Delta \tilde{h} = \Delta h,$$

independently of the materials present at the measurement positions on the measured surface.

The step 114 of applying the correction function or profile $C(x,y)$ is carried out for each measurement point or position of the surface of the object to be measured corresponding to one and the same position of interest on the reference surfaces. If the points or positions of measurement and interest are not superimposed, their spatial relationship is of course taken into account.

In order to allow optimal application of the correction profile $C(x,y)$, the step 114 of applying the correction function or profile $C(x,y)$ can also comprise, prior to applying this correction function, a step of geometrical alignment in order to align the measured profile $\hat{h}(x,y)$ with the first and/or second reference profile, for example in translation, rotation and/or enlargement, such that these profiles are best superimposed in the plane (x,y).

Figure 2:
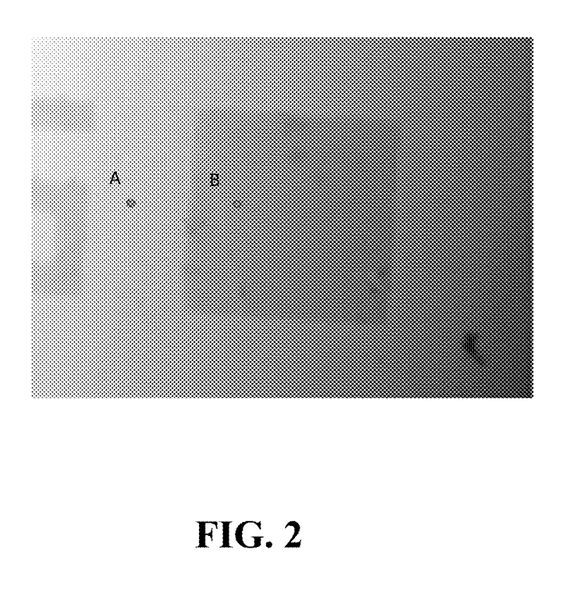
FIG. 2 shows an example of a surface to be measured of an object.

FIG. 2 shows an example of a surface of an object to be measured, comprising a raised portion (in the centre). Two positions of interest situated respectively below (A) and above (B) the raised portion are also illustrated, for determining a correction profile $C(x,y)$. In fact, without applying the method according to the invention, the relative height of these two positions measured by an interferometric method would not correspond to the physical relative height.

Figure 3A:
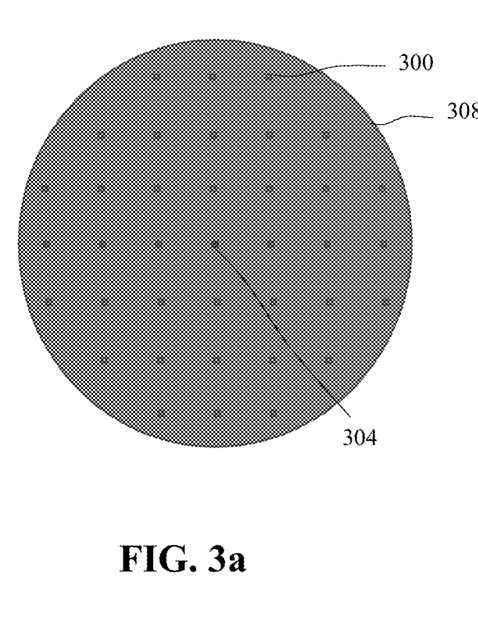
FIGS. 3a and 3b represent respectively diagrams of a metallized wafer and a non-metallized wafer, each wafer comprising several chips.
Figure 3B:
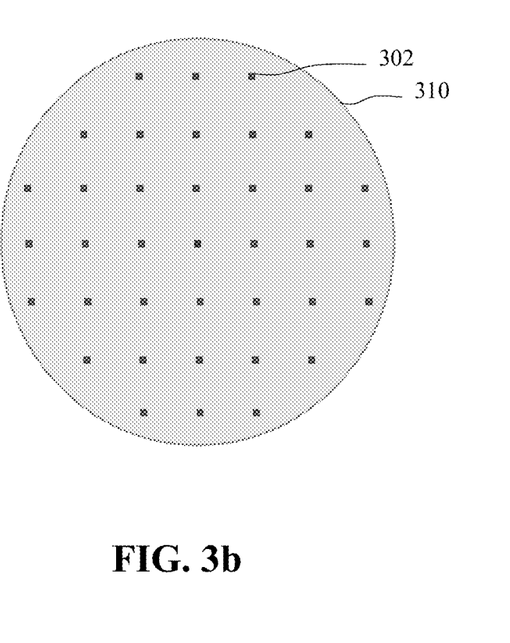

FIGS. 3a and 3b each diagrammatically represent a wafer 308, 310 comprising several chips 300, 302. The two wafers originate from the same production series or the same batch. The wafer 310 represents a wafer to be tested or measured.

The wafer 308 in FIG. 3a is used as a reference wafer 308 for determining the correction profile, for example according to calibration step 102 of the method 100, by carrying out a measurement of a first profile of the surface of the wafer before metallization and a second profile of the surface of the wafer after metallization. This correction profile can be calculated for all the chips 300 of the reference wafer 308. Alternatively, a reference chip 304 can be defined, for example at the centre of the reference wafer 308 and the correction profile calculated for this reference chip 304 only.

The correction profile can then be used for inspecting the chips 302 of the wafer 310 to be measured, for example according to the step 110 of the method 100 in FIG. 1. Thus corrected profiles h̃(x,y) are obtained for each of the chips 302 of the wafer to be measured 310. If the correction profile was determined for the reference chip 304 only, this same correction function is applied in order to obtain corrected profiles h̃(x,y) for each of the chips 302 of the wafer 310 to be measured, by spatial compensation of this correction profile.

Figure 4A:
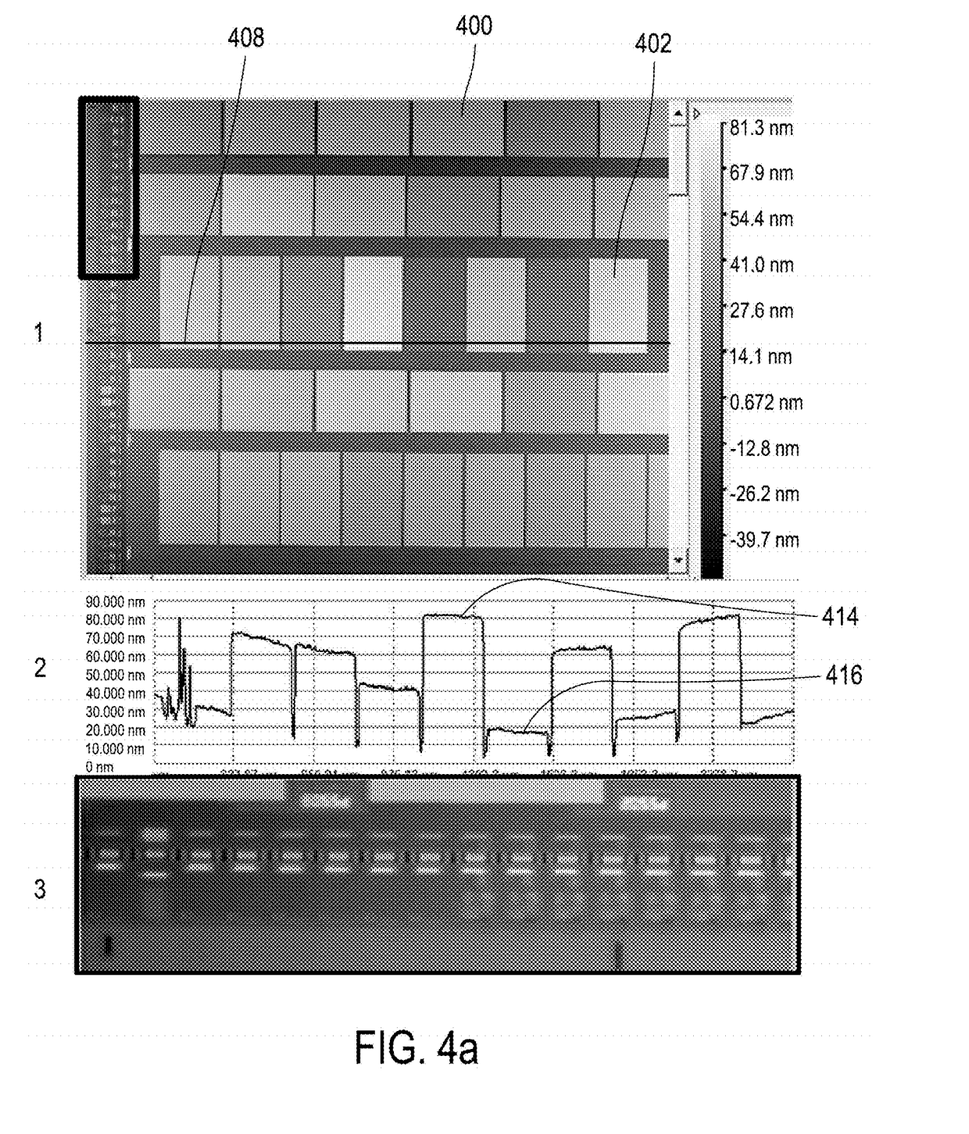
FIGS. 4a-4c are representations of a non-limitative example of measurement of the profile of a surface of an object such as a wafer with the present invention.
Figure 4B:
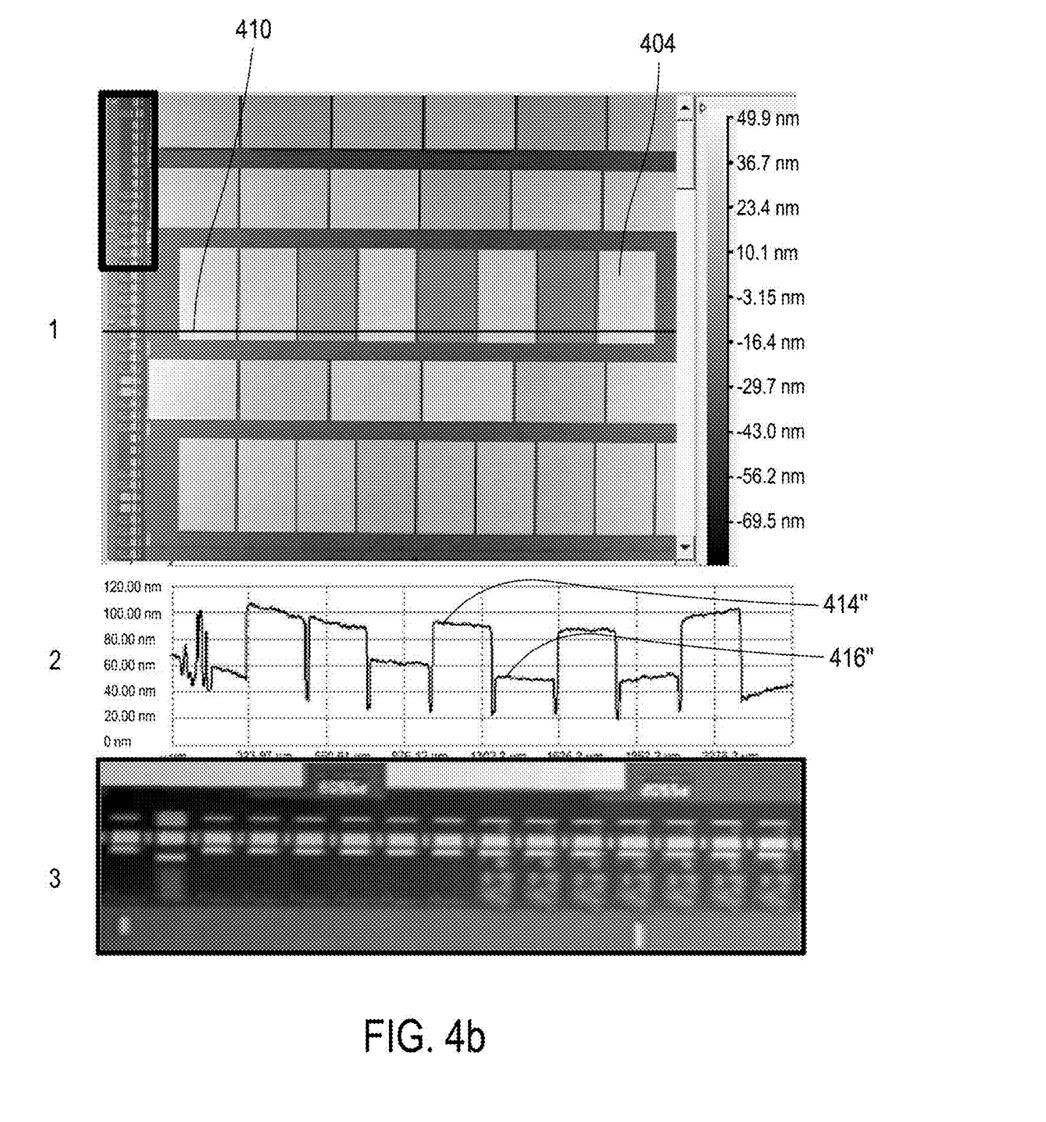
Figure 4C:
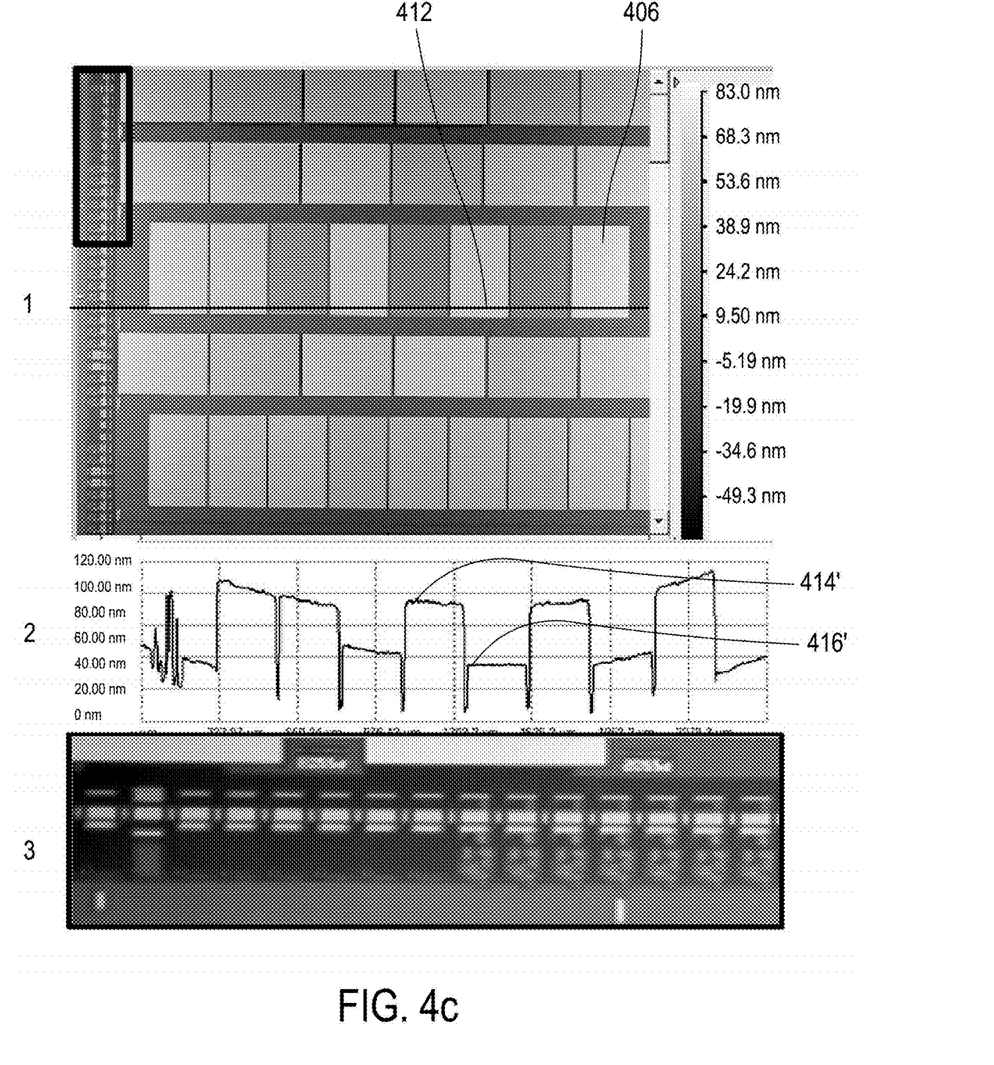

FIGS. 4a-4c show examples of profile measurements carried out according to the method according to the invention, such as for example the method 100 in FIG. 1. In particular, the surface 400 shown in FIG. 4a is a surface to be inspected of a chip or portion of a chip having patterns made from dissimilar materials, the chip being called test chip hereinafter.

FIG. 4a shows an example of an uncorrected measurement on the test chip, for example a chip or portion of a chip 302 of the non-metallized wafer in FIG. 3b, the measurement being carried out, for example, according to steps 112 and 114 of the method 100.

FIG. 4b shows an example of a corrected measurement, on the same test chip, the measurement being carried out for example according to steps 112, 114 and 116 of the method 100.

By way of comparison with respect to the corrected measurement, FIG. 4c shows an example of a measurement on a similar chip or portion of a chip of a metallized wafer, such as for example a chip 300 of the metallized wafer in FIG. 3a. The measurement can be carried out, for example, according to steps 112 and 114 of the method 100.

In FIGS. 4a-4c, the first line shows respectively the complete topography of the chip or of the portion of a chip over the entire field of the interferometric sensor. The chips each present elements or blocks of different heights 402, 404, 406 made from different materials.

The second line in FIGS. 4a-4c represents respectively the profile according to lines 408, 410, 412 inserted into the complete topographies. The y-axis corresponds to the measured height of the different blocks along lines 408, 410, 412. It is noted that the relative heights of the blocks differ between the uncorrected measurement of the non-metallized test chip (FIG. 4a) and the measurement on the metallized chip (FIG. 4c), and that the relative heights of the blocks are similar for the corrected measurement (FIG. 4b) and the measurement on the metallized chip (FIG. 4c).

For example, the relative height between the fourth and fifth block can be considered for the three measurements. The relative height between the block 414 and the block 416 is approximately 60 nm for the uncorrected test chip (FIG. 4a), and the corresponding relative height between the block 414' and the block 416' is approximately 40 nm for the metallized chip (FIG. 4c) at the same location. Effectively the same relative height of approximately 40 nm between the blocks 414" and 416" is found for the corrected measurement on the test chip (FIG. 4b). It is also noted that the overall configuration of the blocks is indeed reproduced for the corrected measurement (FIG. 4b) with respect to the measurement on the metallized chip (FIG. 4c).

The third line in FIGS. 4a-4c represents the framed detail of the first line of the measurement field for each of the measurements. This detail makes it possible in particular to appreciate the difference in appearance between the uncorrected measurement and the corrected measurement on the test chip (FIGS. 4a and 4b), as well as the similarity between the corrected measurement and the measurement on the metallized chip (FIGS. 4a and 4c).

Figure 5A:
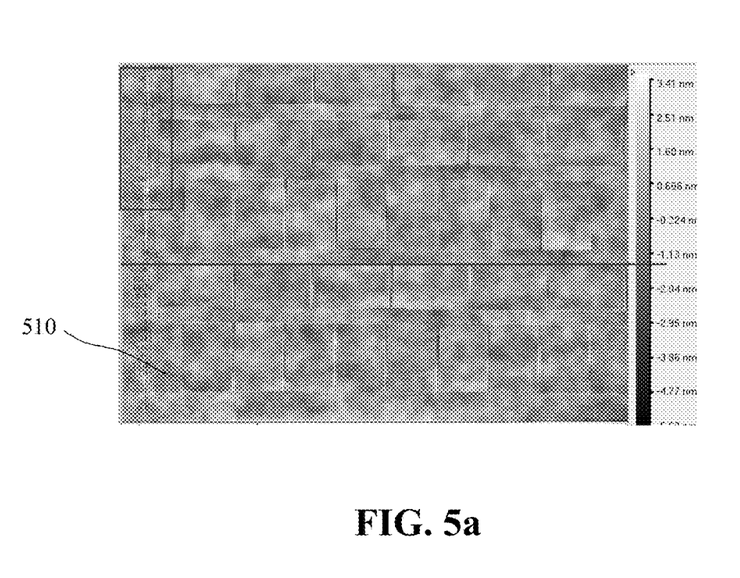
FIGS. 5a and 5b represent a non-limitative example of a measurement result obtained with the present invention.
Figure 5B:
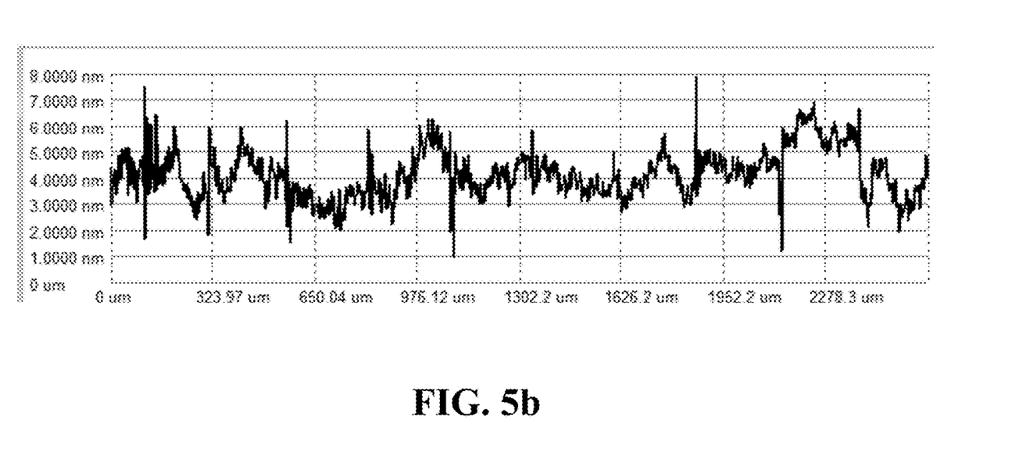

FIGS. 5a and 5b represent by way of example the difference between the corrected profile of the test chip, shown in FIG. 4b, and the profile of the metallized chip, shown in FIG. 4c. This difference makes it possible to show the accuracy of the corrected topography with respect to the topography on the metallized layer that is considered to be the "ground truth". FIG. 5a shows this difference over the entire measurement field, and FIG. 5b shows this difference along the line 510 inserted into FIG. 5a.

In FIG. 5a, the difference between the topographies measured for the test chip and the metallized chip is shown in greyscale. It is noted that the amplitude of the difference does not exceed a few nanometres over the measurement field as a whole. This residue is higher at the edges of the blocks, which may be due to residual positioning errors between the reference chips, or between the correction profile and the test chip.

FIG. 6 is a diagrammatic representation of a non-limitative embodiment of a measurement system according to the invention.

The system 600, shown in FIG. 6, comprises a light source 602, for example based on light-emitting diodes or a halogen source. The light source 602 generates a light beam 604 within visible wavelengths and/or near infrared. This light beam 604 is directed towards a full-field interferometer 606 by a cube or a splitter blade 608.

In the full-field interferometer 606, the light beam 604 is separated into a reference beam that illuminates a reference mirror and a measurement beam that illumines a surface 400 of an object to be inspected. This surface 400 to be inspected can be, for example, that represented in FIG. 4a. The light reflected respectively by the surface 400 and by the reference mirror is redirected towards a sensor array 610, for example of the CCD or CMOS type.

The system 600 comprises optics and lenses, including an imaging objective, arranged so as to image the surface 400 on the sensor array 610. When the difference in the optical paths between the measurement beam and the reference beam is less than the coherence length of the light source 602, the interference fringes due to the interferences between the measurement beam and the reference beam are also visible.

Different types of full-field interferometers 606 can be used within the scope of the invention, for example a phase-shifting interferometer or a vertical scanning interferometer. These interferometers are well known to a person skilled in the art and therefore will not be detailed here.

The system 600 also comprises a device 614 for deposition of a layer of metal on the second reference surface, this metallization being carried out prior to acquiring the interferometric signal from the second reference surface. The deposition device 614 can be for example a physical vapour deposition device (PVD). Deposition devices for metallic layers are well known to a person skilled in the art and will not be detailed here.

The system 600 also comprises an electronic/computational module 612, such as a processor or an electronic chip or also a computer for example, linked to the sensor array 610, and configured to implement all of the steps of the method according to the invention, such as for example the steps 104-116 of the method 100 described above with reference to FIG. 1.

Of course, the invention is not limited to the examples that have just been described, and numerous modifications may be made to these examples without exceeding the scope of the invention.

The invention claimed is:

1. A method for measuring the profile of a surface of an object to be measured, in comprising zones or structures made from at least two different materials, the method comprising a step of:
   acquiring a profile signal of the surface of the object to be measured, wherein the object to be measured forms part of a plurality of substantially identical objects, the plurality of objects also comprising at least one reference object having at least one reference surface, the method further comprising the following steps:
   acquiring a first reference profile signal of a first reference surface;
   acquiring a second reference profile signal of a second reference surface, the second reference surface being metallized;
      determining a correction function from the first reference profile signal and the second reference profile signal; and
      applying the correction function to the profile signal from the surface of the object to be measured to obtain a corrected profile signal, wherein the first and second reference profile signals are obtained from interferometric measurements.

2. The method according to claim 1, wherein the steps of acquiring a profile signal of the surface of the object to be measured and applying the correction function are carried out for a plurality of objects to be measured originating from one and the same production series.

3. The method according to claim 2, wherein the step of determining a correction function is carried out with at least one reference object originating from one and the same production series as the objects to be measured.

4. The method according to claim 1, wherein the second reference surface corresponds to the first, metallized, reference surface, of one and the same reference object.

5. The method according to claim 1, wherein the first reference surface and the second reference surface are corresponding surfaces of two different reference objects.

6. The method according to claim 1, further comprising a metallization step, including deposition of a conforming layer of metal on a reference surface of a reference object.

7. The method according to claim 1, wherein the step of determining the correction function is carried out at several positions, called positions of interest, of the first and second reference surface, located identically on the first reference surface and the second reference surface, respectively.

8. The method according to claim 7, wherein:
   the step of acquiring a profile signal is carried out at several positions, called measurement positions, of the surface of the object to be measured, located identically to the positions of interest of the reference surfaces, or located in zones of the same materials as the positions of interest; and
   the step of applying the correction function is carried out for said measurement positions of the surface of the object, by taking account of the corresponding positions of interest.

9. The method according to claim 1, wherein the step of determining a correction function comprises a difference between the second reference profile signal and the first reference profile signal.

10. The method according to claim 1, wherein the step of applying the correction function comprises a summation of a correction profile signal and the profile signal.

11. The method according to claim 1, further comprising at least one of the following steps:
   a step of geometrical alignment of the second profile signal from the second reference surface with respect to the first profile signal from the first reference surface; and
   a step of geometrical alignment of the profile signal from the surface of the object to be measured with respect to the first or second profile signal of a reference surface.

12. The method according to claim 1, wherein the profile of a surface of an object to be measured comprises a substrate such as a wafer, or an element such as a chip produced on a substrate.

13. The method according to claim 12, further comprising the steps of:
   determining a correction function from at least one reference substrate,
   acquiring a profile signal from another substrate to be measured.

14. A device for measuring the profile of a surface of an object to be measured, the surface having zones made from at least two different materials, the device comprising:
   an interferometric measurement device arranged for acquiring a first profile signal of the surface of the object to be measured, the object to be measured forming part of a plurality of substantially identical objects, the plurality of objects also comprising at least one reference object having at least one reference surface, the interferometric measurement device being further adapted for acquiring a first reference profile signal from a first reference surface and, a second reference profile signal from a second, metallized reference surface; and
   a processing module configured in order to determine a correction function from the first reference profile signal and the second reference profile signal, and to apply said correction function to the profile signal from the surface of the object to be measured in order to obtain a corrected profile signal.

15. The device according to claim 14, wherein the interferometric measurement device comprises a full-field interferometric sensor.

16. The device according to claim 15, wherein the interferometric sensor comprises one from a phase-shifting interferometer and a vertical scanning interferometer.

* * * * *